Oct. 25, 1960  YOSHIO SASAKI  2,957,303
EXPANSIBLE BAND
Filed July 2, 1956
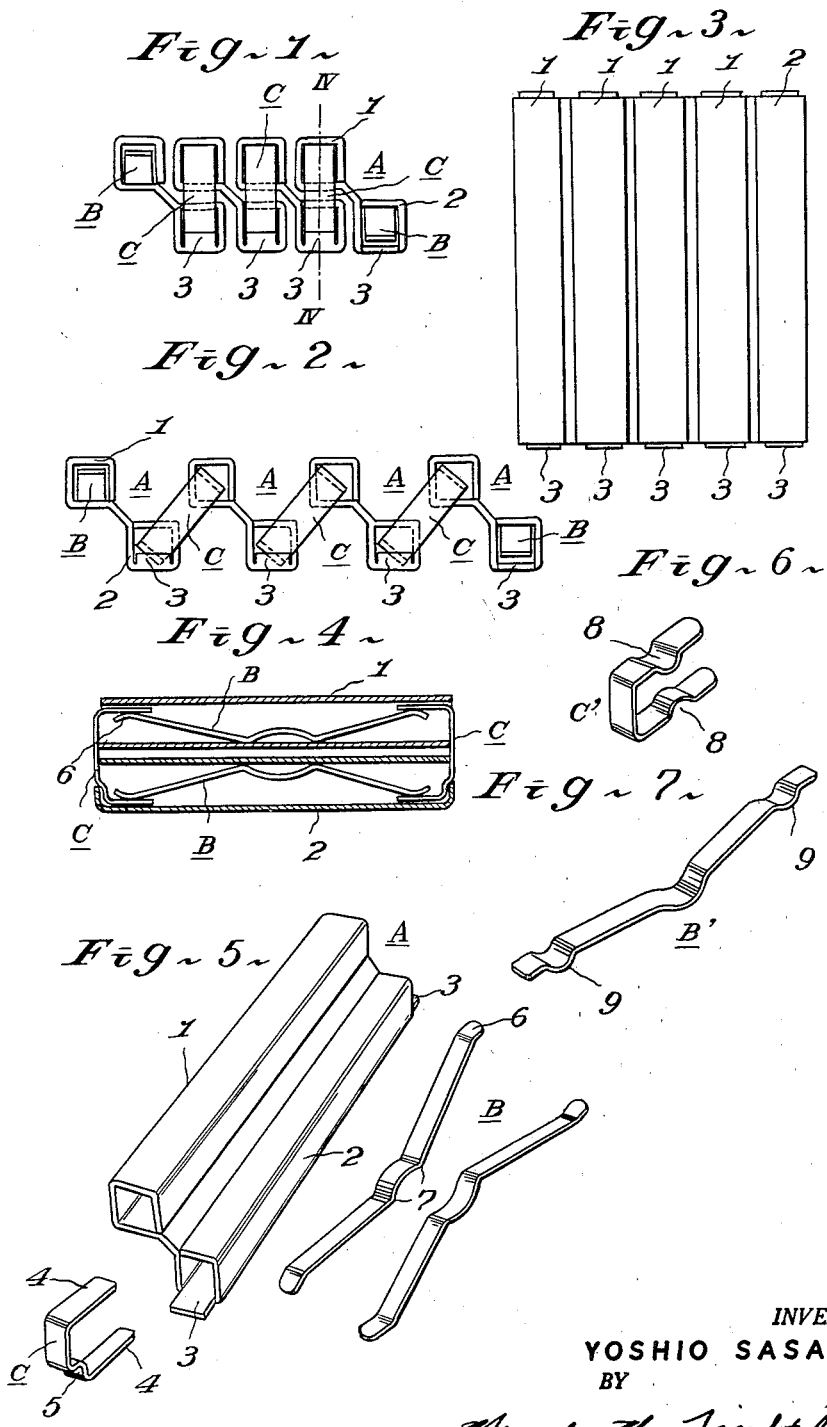
INVENTOR.
YOSHIO SASAKI

2,957,303

EXPANSIBLE BAND

Yoshio Sasaki, Edogawa-ku, Tokyo-to, Japan, assignor to Kabushiki-Kaisha Maruman (as known Maruman Co. Limited), Tokyo-to, Japan, a Japanese limited-liability company Filed July 2, 1956, Ser. No. 595,385

Claims priority, application Japan Dec. 28, 1955

3 Claims. (Cl. 59—79)

This invention relates to expansible bands for use of various objects, for example, for use of as watch bands.

An essential object of this invention is to provide an expansible band of which chain pieces are very simple in their press working and assembly.

Another object of this invention is to provide an expansible band which is made up of parts of simple shape and of easy manufacture, said parts being able to be easily assembled.

A further object of this invention is to provide a very simple expansible band of which chain pieces are hardly decomposed by mere stretching.

Further objects and advantages will appear more fully from the following description, especially when taken in connection with examples of this invention which are shown in the accompanying drawings, wherein:

All figures are shown by greatly enlarged views for making the construction understandable.

Fig. 1 is a front view of a part of an expansible band embodying this invention in contracted form;

Fig. 2 is a similar view of the band shown in Fig. 1, in expanded form;

Fig. 3 is a top plan view of the band shown in Fig. 1;

Fig. 4 is a vertical-section on the line IV—IV of Fig. 1;

Fig. 5 is perspective views of the decomposed constructive members of the band illustrated in Figs. 1–4;

Fig. 6 is a perspective view of a modified connecting link of this invention; and Fig. 7 is a perspective view of a modified flat spring of this invention which is to be used together with the connecting link shown in Fig. 6.

Referring to Figs. 1–5, the expansible band is composed of many chain pieces A which are arranged side by side, connecting links C connecting each piece to the adjacent piece, and flat springs B acting on said links so as normally to hold the chain pieces in abutting relationship with one another, but permitting them to move apart so as to allow expansion of the band.

Each chain piece A is formed by upper and under cylindrical sheaths 1 and 2 which are diagonally connected as one body of 8 type. Said under sheath 2 is provided with tabs 3 at both upper ends thereof.

Each flat spring B having a central bowed portions 7 and having outwardly bent end portions, of which free ends 6 being inwardly bent, is supported within each chain piece by the spring force thereof.

Each connecting link C is formed by U-shaped piece having two flat legs 4, said link being provided with a concave portion 5 at one shoulder thereof. Said link is of substantially the same width as the inside width of the sheath of the chain piece A.

For the assembly of said three members A, B and C to manufacture an expansible band, chain pieces A are first arranged side by side after insertion of the flat spring B in each chain piece so that upper sheath 1 of every one of the chain pieces A and under sheath 2 of the adjacent chain piece A may be so overlapped as shown clearly in Fig. 1, and then upper leg of each connecting link C is inserted between the wall of an upper sheath 1 and the bowed end 6 of the spring B fitted therein and under leg of said link inserted between the wall of the under sheath 2 just below said upper sheath 1 and the bowed end 6 of the spring B fitted therein, as shown in Fig. 4.

The tabs 3 are then bent so as to engage with the concave portions 5 of the links C, thereby falling of the connecting links is securely avoided.

With said construction, the springs normally hold the connecting links in the positions, as shown in Figs. 1 and 3, and the band is contracted. If a pull is exerted, however, the chain pieces may move apart, as shown in Fig. 2, tilting the legs of the connecting links against the action of the springs B. When the tension is released, the springs will restore the band to its contracted condition.

To remove one or more links, for repairing or shortening the band, the tabs 3 are bent outwards and the links are removed.

The tabs 3 in the illustration in Figs. 1–5 may be used at other end portion or portions of the sheaths 1 and 2.

For the purpose of avoiding falling of the connecting links, such a modified U-shaped connecting link C′ provided with inwardly bowed portions 8 at its both legs and such a flat spring B′ provided with bowed portions 9 at its both end portions, said portions 9 being selected so as to be engaged in said portions 8, as shown in Figs. 6 and 7, can be used. In this case, tabs 3 which are necessary in the band illustrated in Figs. 1–5 would become unnecessary.

In the expansible band heretofore in use, a single cylindrical sheath is generally used as each of the chain pieces of the band, so that their press and assembly workings are relatively complicated, which results in expansible construction of the band.

According to this invention, however, as clearly understood from the above description, chain pieces, each having upper and under sheaths which are diagonally connected as one body of 8 type and press and assembly workings thereof being very simple, are adopted as the chain pieces of the expansible band, so that simple and cheap expansible band will be obtained.

While I have shown particular embodiments of my invention, it will of course be understood that I do not wish to be limited thereto, since many modifications may be made and I, therefore, contemplate by the appended claims to cover all such modifications as fall within the true spirit and scope of my invention.

I claim as my invention:

1. In an expansible band, the combination of a plurality of chain pieces each consisting of a single sheet of rigid material formed into an upper transversely disposed closed tubular member and a lower transversely disposed closed tubular member, said tubular members having the same shape and being laterally offset from each other a distance greater than the dimension of each tubular member in the direction of offset, a diagonal web rigidly connecting said tubular members, said chain pieces being positioned with an upper tubular member on one chain piece over a lower tubular member on the next adjacent chain piece when the band is in the unexpanded condition, a plurality of links between the ends of the upper tubular members and the ends of the lower tubular members on the next adjacent chain pieces which are below the upper tubular members in the unexpanded condition of the band, said links having a width substantially the same as the dimension of said tubular members in the direction of the length of said band, means retaining said links in assembled relationship with said tubular members, and spring means having a substantially flat surface thereon at the ends of said tubular members, and said links having legs thereon extending into said tubular members with substantially flat surfaces thereon engageable with the flat surface on said spring means, said flat surfaces meeting each other when said links are in a position at substantially right angles to the length of said band for holding said links in said position in the unexpanded condition of said band, and said legs pivoting in the ends of said tubular members against the action of said spring means when the band is expanded.

2. The combination as claimed in claim 1 in which said means retaining said links comprise tabs on the ends of at least the lower tubular members bent over the outside of said links for blocking movement of said links out of said tubular members.

3. The combination as claimed in claim 2 in which each U-shaped link has a concave portion at one shoulder thereof into which said tab extends in the inwardly bent position.

References Cited in the file of this patent

UNITED STATES PATENTS

| | | |
|---|---|---|
| 1,089,931 | Loog | Mar. 10, 1914 |
| 1,730,105 | Whiting | Oct. 1, 1929 |
| 1,809,277 | Kestenman | June 9, 1931 |
| 2,513,288 | Cowan | July 4, 1950 |
| 2,689,450 | Stiegele | Sept. 21, 1954 |
| 2,799,135 | Dolansky | July 16, 1957 |

FOREIGN PATENTS

| | | |
|---|---|---|
| R. 17,099 | Germany | June 28, 1956 |